(12) United States Patent
Eun et al.

(10) Patent No.: US 8,535,636 B1
(45) Date of Patent: Sep. 17, 2013

(54) METHOD OF SEPARATING GROUP II NUCLIDES FROM RADIOACTIVE WASTE LITHIUM CHLORIDE SALT AND RECOVERING PURE LITHIUM CHLORIDE USING LITHIUM OXIDE

(71) Applicants: Korea Atomic Energy Research Institute, Daejeon (KR); Korea Hydro & Nuclear Power Co., Ltd., Seoul (KR)

(72) Inventors: Hee Chul Eun, Daejeon (KR); Yung Zun Cho, Daejeon (KR); Hwan Seo Park, Daejeon (KR); Tae Kyo Lee, Pohang-si (KR); In Tae Kim, Daejeon (KR); Geun Il Park, Daejeon (KR)

(73) Assignees: Korea Atomic Energy Research Institute (KR); Korea Hydro & Nuclear Power Co., Ltd. (KR)

( * ) Notice: Subject to any disclaimer, the term of this patent is extended or adjusted under 35 U.S.C. 154(b) by 15 days.

(21) Appl. No.: 13/624,744

(22) Filed: Sep. 21, 2012

(30) Foreign Application Priority Data

May 24, 2012 (KR) ................ 10-2012-0055680

(51) Int. Cl.
*C01F 5/00* (2006.01)
(52) U.S. Cl.
USPC .................................. 423/499.3; 423/158
(58) Field of Classification Search
USPC .................... 423/499.3, 158–160
See application file for complete search history.

(56) References Cited

U.S. PATENT DOCUMENTS

2009/0005628 A1* 1/2009 Cho et al. .............. 588/18

OTHER PUBLICATIONS

H. C. Eun et al., "Study on a separation method of radionuclides (Ba,Sr) from LiCl salt wastes generated from the electroreduction process of spent nuclear fuel", J. Radioanal Nucl Chem (2012) vol. 292, pp. 531-535.

* cited by examiner

*Primary Examiner* — Steven Bos
(74) *Attorney, Agent, or Firm* — Knobbe Martens Olson & Bear LLP

(57) ABSTRACT

Disclosed herein is a method of separating group II nuclides from a radioactive waste lithium chloride salt and recovering renewable lithium chloride, comprising the steps of: injecting lithium oxide into a lithium chloride salt containing group II nuclides to convert the group II nuclides into thermally-stable oxide or oxychloride; and vaporizing and condensing the lithium chloride salt under a reduced pressure condition to separate the group II nuclides and recover recyclable lithium chloride. The method is advantageous in that group II nuclides existing in the form of chloride, which is not highly thermally-stable in a lithium chloride (LiCl) to salt and is not easily solidified, can be converted into oxides or oxychlorides, which is highly thermally-stable in the lithium chloride (LiCl) salt and is easily solidified, without producing impurities.

6 Claims, 1 Drawing Sheet

METHOD OF SEPARATING GROUP II NUCLIDES FROM RADIOACTIVE WASTE LITHIUM CHLORIDE SALT AND RECOVERING PURE LITHIUM CHLORIDE USING LITHIUM OXIDE

BACKGROUND OF THE INVENTION

1. Technical Field

The present invention relates to a method of separating group II nuclides from a radioactive waste lithium chloride salt and recovering pure lithium chloride using lithium oxide.

2. Description of the Related Art

In a pyroprocess of recovering uranium and transuranic (TRU) metals from oxide-type spent nuclear fuel, during the electro-reduction process of converting the oxide-type spent nuclear fuel into metal-type spent nuclear fuel, lithium chloride (LiCl) is used as a high-temperature electrolyte, and lithium chloride (LiCl) waste containing barium (Ba) and strontium (Sr) as radioactive nuclides is discharged. Particularly, since strontium (Sr) is a high-heat generation nuclide, the lithium chloride (LiCl) waste containing strontium (Sr) must be stably processed.

There is a technology for recovering a suitable amount of recyclable lithium chloride (LiCl) from the lithium chloride (LiCl) waste and concentrating barium (Ba) and strontium (Sr) nuclides in lithium chloride (LiCl) [Korean Patent No. 10-2008-0093470, 12/500,869]. However, the Ba and Sr nuclides-concentrated lithium chloride (LiCl) waste discharged by this technology has high solubility in water, cannot be easily solidified, and includes a large amount of high-corrosion lithium chloride (LiCl). Further, since barium (Ba) and strontium (Sr) also exist in the form of chlorides, it is not easy to process this lithium chloride (LiCl) waste.

It was reported in the non-patent documents of the U.S.A that barium (Ba) and strontium (Sr) can be selectively removed from the molten LiCl—KCl salt system using zeolite 4A [Non-patent documents: Michael F. Simpson* and Mary Lou D. Gougar, "Two-Site Equilibrium Model for Ion Exchange between MonovalentCations and Zeolite-A in a Molten Salt", Ind Eng. Chem. Res. 2003, 42, 4208-4212, R. K. Ahluwalia,* H. K. Geyer, C. Pereira, and J. P. Ackerman, "Modeling of a Zeolite from Molten Salt", Ind Eng. Chem. Res. 1998, 37, 145-153, Supathom Phongikaroon and Michael F. Simpson, "Equilibrium Model for Ion Exchange Between Multivalent Cations and Zeolite-A in a Molten Salt", AICHE, 2006, 52(5), 1736-1743, Lexa D., "Occlusion and ion exchange in the molten (lithium chloride potassium chloride to alkaline earth chloride) salt zeolite 4A system with alkaline earth chlorides of calcium and strontium, and in the molten (lithium chloride potassium chloride actinide chloride) salt zeolite 4A system with the actinide chloride of uranium", Metallurgical and Materials Transactions B. 2003, 34, 201-208]. However, in the LiCl system, the zeolite structure completely breaks down, which means that the ion-exchange performance and occlusion performance of zeolite 4A disappear. Therefore, the ability of zeolite 4A to selectively remove barium (Ba) and strontium (Sr) cannot be used in the LiCl system ["PWR spent nuclear fuel volume reduction technology development (II)", Korea Atomic Energy Research Institute, KAERI/RR-3132/2009]. Further, when zeolite is used, there is a problem in that a large amount of sodium (Na) is introduced into lithium chloride (LiCl), so that the composition of lithium chloride (LiCl) changes, with the result that it is difficult to recycle this lithium chloride (LiCl).

In order to solve the above problem, there is a method of separating nuclides and recovering LiCl by converting Sr and Ba included in LiCl into sulfates or carbonates thermally stable compared to chlorides using $Li_2SO_4$ or $Li_2CO_3$ and vaporizing LiCl [Non-patent document, H. C. Eun et al., Study on a separation method of radionuclides (Ba,Sr) from LiCl salt wastes generated from the electroreduction process of spent nuclear fuel, available online, 23 September 2011, JRNC]. However, this method is also disadvantageous in that the finally-produced sulfate-type nuclides do not easily solidify, and the finally-produced carbonate-type nuclides are thermally unstable at the solidification temperature.

Thus, the present inventors have developed methods of recovering renewable LiCl by converting Sr and Ba included in LiCl into easily-solidifiable oxide (or oxychloride) using $Li_2O$ and then distilling LiCl at a reduced pressure condition, thus completing the present invention.

SUMMARY OF THE INVENTION

Accordingly, the present invention has been devised to solve the above-mentioned problems, and an object of the present invention is to provide a method of separating group II nuclides (Ba and Sr) from a radioactive waste lithium chloride (LiCl) salt and recovering pure lithium chloride (LiCl) using lithium oxide ($Li_2O$), in which high-heat generation group II nuclides (Ba and Sr) included in LiCl are converted into easily-solidifiable oxides or oxychlorides without producing impurities, and then renewable LiCl is separated and recovered by a vacuum distillation method to reduce the amount of produced radioactive waste.

In order to accomplish the above object, an aspect of the present invention provides a method of separating group II nuclides from a radioactive waste lithium chloride salt and recovering renewable lithium chloride, including the steps of: 1) injecting lithium oxide into a lithium chloride salt containing group II nuclides to convert the group II nuclides into thermally-stable oxides or oxychlorides; and 2) vaporizing and condensing the lithium chloride salt under reduced pressure to separate the group II nuclides and recover recyclable lithium chloride

BRIEF DESCRIPTION OF THE DRAWINGS

The above and other objects, features and advantages of the present invention will be more clearly understood from the following detailed description taken in conjunction with the accompanying drawings, in which.

REFERENCE NUMERALS

Figure 1:
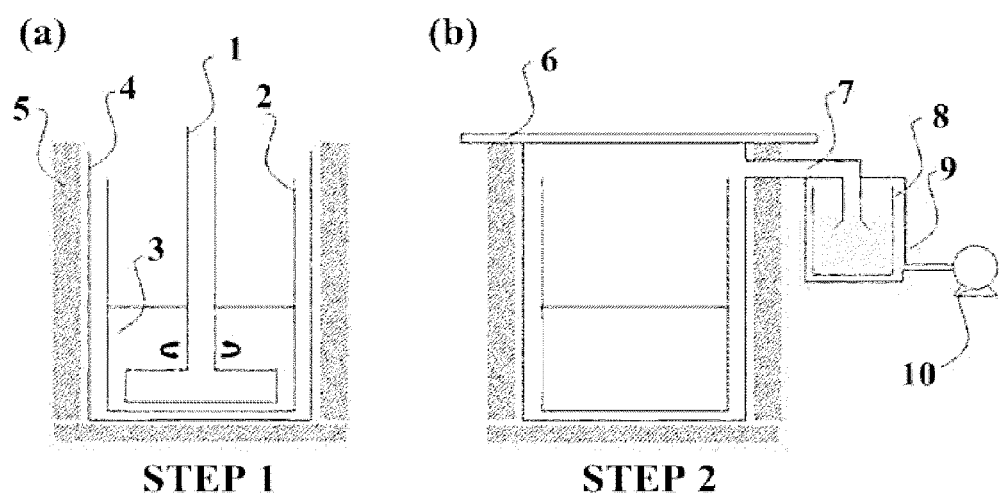
FIG. 1 is a schematic view showing a method of separating group II nuclides (Ba and Sr) from a radioactive waste lithium chloride (LiCl) salt and recovering renewable lithium chloride (LiCl) ((a): step 1 and (b): step 2) according to the present invention.

1: impeller
2: reaction vessel
3: LiCl—$BaCl_2$—$SrCl_2$—$Li_2O$ mixture
4: reactor
5: electric heater
6: flange
7: vapor transfer pipe
8: recover vessel
9: cooling water jacket
10: vacuum pump

DESCRIPTION OF THE PREFERRED EMBODIMENTS

The present invention provides a method of separating group II nuclides (Ba and Sr) from a radioactive waste lithium chloride salt and recovering renewable lithium chloride, including the steps of: injecting lithium oxide ($Li_2O$) into a lithium chloride salt containing group II nuclides to convert the group II nuclides into thermally-stable oxides or oxychlorides (step 1); and vaporizing and condensing the lithium chloride salt under a reduced pressure condition to separate the group II nuclides and recover recyclable lithium chloride (step 2).

The present invention provides a method of separating group II nuclides from a radioactive waste lithium chloride salt and recovering renewable lithium chloride, including the steps of: 1) injecting lithium oxide into a lithium chloride salt containing group II nuclides to convert the group II nuclides into thermally-stable oxides or oxychlorides; and 2) vaporizing and condensing the lithium chloride salt under a reduced pressure condition to separate the group II nuclides and recover recyclable lithium chloride.

In the method, in step 1), the group II nuclides may be dissolved in the lithium chloride salt in the form of chloride.

Further, in step 1), the reaction of converting the group II nuclides into thermally-stable oxides or oxychlorides may be carried out by stirring the group II nuclides at a temperature of 610° C. to 650° C. for 2 hours or more, but is not particularly limited thereto.

Further, the group II nuclides contained in the lithium chloride salt may be converted into a thermally-stable compound including oxides or oxychlorides. Here, the thermally-stable compound is a compound that can maintain a chemical form at a temperature of 1000° C. or more, which is higher than the temperature required to vaporize lithium chloride.

Further, in step 2), the lithium chloride salt may be vaporized at a temperature of 850° C. to 950° C. and a pressure of 2 Torr to 8 Torr, but is not particularly limited.

Further, the temperature of the bottom of the recovery vessel may be 50° C. or less, but is not particularly limited.

Further, in step 2), the renewable lithium chloride may exist in the form of a lump.

The term "solidification treatment" used in the present invention is a method of physically and chemically stabilizing harmful waste materials by adding a solidification medium.

Hereinafter, the method of separating group II nuclides (Ba and Sr) from a radioactive waste lithium chloride salt and recovering renewable lithium chloride according to the present invention will be described in detail with reference to FIG. 1.

In the method of separating group II nuclides (Ba and Sr) from a lithium chloride salt and recovering recyclable lithium chloride according to the present invention, in step 1, lithium oxide ($Li_2O$) is injected into a lithium chloride salt containing group II nuclides to convert the group II nuclides into thermally-stable oxides or oxychlorides.

In order to convert the group II nuclides into thermally-stable oxides or oxychlorides by injecting lithium oxide ($Li_2O$) into the lithium chloride (LiCl) salt, this process must be performed at about 610° C. at which the lithium chloride (LiCl) salt can exist in a molten state, but the operation temperature in this process must not exceed 650° C. because the molten lithium chloride (LiCl) salt has high volatility. The group II nuclides are dissolved in the molten lithium chloride (LiCl) salt in the form of chloride. In order to convert these group II nuclides into the thermally-stable oxide or oxychloride, a predetermined equivalent of lithium oxide ($Li_2O$) or more must be injected into the lithium chloride (LiCl) salt. The amount of the injected lithium oxide ($Li_2O$) is changed depending on the kind of nuclides. Therefore, in order to convert most of the group II nuclides into thermally-stable oxides or oxychlorides, lithium oxide ($Li_2O$) must be injected after calculating the maximum equivalent of the group II nuclides that are required to undertake the conversion, in which all of the group II nuclides must be considered. In order to effectively perform the conversion of group II nuclides into thermally-stable oxides or oxychlorides, lithium oxide ($Li_2O$) is injected into the molten lithium chloride (LiCl) salt, and then stirred for a predetermined amount of time such that lithium oxide ($Li_2O$) easily reacts with the group II nuclides. In this case, the stirring may be performed using an impeller for 2 hours or more although the stirring time can be changed depending on the amount of the sample, thus increasing the conversion ratio of the group II nuclides. The conversion of the group II nuclides (Ba and Sr) included in the molten lithium chloride (LiCl) salt into oxide or oxychloride is represented by the following Reaction Formula 1 and 2.

$$4BaCl_2 + Li_2O = Ba_4OCl_6 + 2LiCl \qquad \text{[Reaction Formula 1]}$$

$$SrCl_2 + Li_2O = SrO + 2LiCl \qquad \text{[Reaction Formula 2]}$$

The oxide (SrO) and oxychloride ($Ba_4OCl_6$) produced by the conversion reaction is not easily separated because they have white colors which are the same as the color of the lithium chloride (LiCl) salt. Further, since an excessive amount of lithium oxide ($Li_2O$) is injected into the molten lithium chloride (LiCl) salt, lithium oxide ($Li_2O$) is present in the molten lithium chloride (LiCl) salt, so that the reaction product of the group II nuclides having extremely low solubility in water can be easily separated when this lithium chloride (LiCl) salt is dissolved in water, but a large amount of waste may be produced because both LiCl and $Li_2O$ are dissolved in water. Further, since pyroprocess is a dry treatment process that does not use water, the produced waste must be treated by a dry process.

Therefore, the lithium chloride (LiCl), reaction products of group II nuclides, and lithium oxide ($Li_2O$) must be separated from the lithium chloride (LiCl) salt including group II nuclide oxides and oxychlorides and lithium oxides ($Li_2O$) by a dry treatment process. Group II nuclide oxides and oxychlorides and lithium oxide ($Li_2O$) are relatively thermally-stable. However, lithium chloride (LiCl) has high volatility compared to these materials. That is, group II nuclide oxides and oxychlorides and lithium oxide ($Li_2O$) can be separated from the lithium chloride (LiCl) salt using the physical properties of lithium chloride (LiCl) having high volatility by a vacuum distillation method, and, in this case, there is the advantage of not producing any secondary waste.

Subsequently, in the method of separating group II nuclides (Ba and Sr) from a radioactive waste lithium chloride salt and recovering renewable lithium chloride according to the present invention, in step 2, the lithium chloride salt is vaporized and condensed under a reduced pressure condition to separate the group II nuclides and recover recyclable lithium chloride.

In order to separate lithium chloride (LiCl) using a vacuum distillation method after the conversion reaction in step 1, the lithium chloride salt must be heated to a temperature at which lithium chloride (LiCl) can be vaporized. In this case, when a reduced-pressure condition is created in a state in which the lithium chloride salt exists in a molten phase, a large amount of lithium chloride (LiCl) is vaporized and condensed into a fine particulate phase in a vent pipe, so that it is difficult to recover the condensed lithium chloride (LiCl). Therefore, the molten lithium chloride salt is cooled to room temperature, and then the vacuum distillation is must be performed.

A vacuum distillation can be used to lower an operating temperature for vaporizing a target material, and the vapor pressure of a target material vs. the temperature becomes data that is important when setting out the operating conditions. The vapor pressure of lithium chloride (LiCl) vs. the temperature can be calculated referring to the non-patent document of [Handbook of Vapor Pressure (C. L. YAWS, Handbook of Vapor Pressure, Volume 4, Inorganic Compounds and Elements, Gulf Publishing, Houston, Tex., USA, 1995.)]. The results thereof are given in Table 1 below.

TABLE 1

| Vapor pressure of lithium chloride (LiCl) vs. temperature | | | | | | | |
|---|---|---|---|---|---|---|---|
| Temperature (° C.) | 600 | 650 | 700 | 750 | 800 | 850 | 900 |
| Pressure (Torr) | 0.009 | 0.047 | 0.175 | 0.526 | 1.348 | 3.077 | 6.445 |

The vacuum distillation of a lithium chloride (LiCl) salt is performed using an apparatus including a vaporization unit, a condensation unit and a vacuum unit. FIG. 1 (a) is a schematic view showing the apparatus.

In order to separate lithium chloride (LiCl) using vacuum distillation, the vaporization temperature is determined based on the vapor pressure data of lithium chloride (LiCl). First, the pressure of the apparatus is reduced such that it is lower than the vapor pressure at the operating temperature before a lithium chloride salt is heated to the determined vaporization temperature, that is, the operating temperature. When a reduced-pressure condition is created, the vaporization unit with the lithium chloride salt is heated to the operating temperature, and, in this case, the temperature of the bottom of the recovery vessel is adjusted to 50° C. or less. In this procedure, lithium chloride is vaporized and introduced into the condensation unit in a vapor phase, and is then deposited into a recover vessel provided in the condensation unit in a solid phase, thus recovering renewable lithium chloride (LiCl). The lithium chloride (LiCl) is recovered in the form of a lump whose size depends on the ease of recovery and treatment.

Further, mixtures of residual group II nuclides existing in the form of an oxide or oxychloride and lithium oxides after the vaporization of lithium chloride (LiCl) contain barely any lithium chloride (LiCl). These mixtures are advantageous in that they are thermally stable and can be easily solidified.

The method of separating group II nuclides (Ba and Sr) from a radioactive waste lithium chloride salt and recovering renewable lithium chloride according to the present invention is advantageous in that (a) group II nuclides existing in the form of a chloride can be converted into their thermally-stable oxide or oxychloride without producing impurities, (b) renewable lithium chloride (LiCl) can be separated from the group II nuclide oxide or oxychloride and lithium oxide ($Li_2O$) by the vacuum distillation to reduce the amount of radioactive waste to be solidified for final treatment, (c) group II nuclides existing in the form of chloride can be converted into thermally-stable oxides or oxychlorides thus making solidification easy, and (d) renewable lithium chloride (LiCl) can be recovered, thus reducing the cost of a raw material.

Hereinafter, the present invention will be described in more detail with reference to the following Examples. However, these Examples are set forth to illustrate the present invention, and the scope of the present invention is not limited thereto.

Example 1

Separation of Group II Nuclides (Ba and Sr) and Recovery of LiCl

1) Preparation of a LiCl Ingot Containing Group II Nuclides Converted into a Form of Oxide or Oxychloride A LiCl salt waste surrogate including 30 g of LiCl, 3 g of $BaCl_2$ and 3 g of $SrCl_2$ was introduced into a graphite vessel, a predetermined equivalent of $Li_2O$ was injected into the graphite vessel, the graphite vessel was heated by an electric heater such that the internal temperature thereof was raised to 610° C., and then the LiCl salt waste surrogate was melted while maintaining the temperature for 2 hours. Subsequently, the molten LiCl salt waste surrogate was stirred at 610° C. for 2 hours to convert group II nuclide chlorides into group II nuclide oxide or oxychloride. Finally, the molten LiCl salt waste ingot was cooled to room temperature to prepare a LiCl surrogate containing group II nuclides converted into a form of oxide or oxychloride.

2) Separation of Group II Nuclide Oxide and Oxychloride and Recovery of a Renewable LiCl Salt The graphite vessel filled with the prepared LiCl ingot was provided in a vaporization unit of a vacuum distillation apparatus, and the pressure in the apparatus was reduced to 0.2 Torr. Using the vacuum distillation apparatus, which can also conduct thermogravimetric analysis, it was possible to monitor the progress of vaporization and whether or not it had finished. The vaporization unit of the vacuum distillation apparatus was heated to 900° C. at a heating rate of 5° C./min under the reduced pressure condition. During the process of heating the vaporization unit of the vacuum distillation apparatus, the temperature of the condensation unit of the vacuum distillation apparatus was controlled to 50° C. or less in order to condense and recover LiCl salt vapor. 30 g of the LiCl salt existing in the graphite vessel was mostly vaporized before the temperature reached 900° C., and, after 10 minutes, the vacuum distillation apparatus was cooled to room temperature. Then, the pressure of the vacuum distillation apparatus which had cooled down to room temperature was increased to atmospheric pressure, and then the reduced-pressure distillation apparatus was opened to obtain a mixture of group II nuclide oxide and oxychloride containing $Li_2O$, the mixture existing in the graphite container, and a renewable LiCl salt was recovered from a recovery vessel of the condensation unit.

Example 2

XRD Analysis of the Mixture of $Li_2O$ and Group II Nuclide Oxide and Oxychloride and Evaluation of Group II Nuclide Separation Efficiency In order to analyze XRD patterns of the mixture of $Li_2O$ and group II nuclide oxide and oxychloride and evaluate group II nuclide separation efficiency, the following experiment was carried out.

Here, there was an attempt to improve the conversion ratio of group II nuclides existing in the form of chloride whiling changing the equivalent of $Li_2O$ based on the concentration of group II nuclides. As a result, the results of the XRD-pattern analysis of the mixture are shown in FIG. 2.

Figure 2:
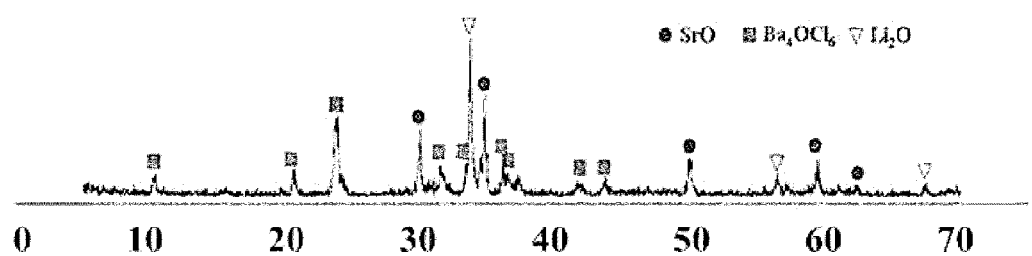
FIG. 2 is a schematic view showing the residual form of a group II nuclide mixture separated after injecting lithium oxide ($Li_2O$) into a lithium chloride salt in an amount of 8 equivalents based on the nuclide concentration according to the present invention.

As shown in FIG. 2, it can be ascertained that the conversion reaction of group II nuclides had taken place effectively when 8 equivalents of $Li_2O$ was injected. Further, it can be ascertained that the peak of $Li_2O$ was remarkably visible, and that the peaks of Ba and Sr in the mixture were not detected.

The recovered LiCl salt was completely dissolved in a nitric acid solution (3N), and then the concentration of Ba and Sr in the solution was analyzed to calculate the separation efficiency of Ba and Sr. As a result, it can be ascertained that both Ba and Sr exhibit a separation efficiency of 99% or more.

As described above, the method of separating group II nuclides (Ba and Sr) from a radioactive waste lithium chloride salt and recovering renewable lithium chloride according to the present invention is effective in that group II nuclides existing in the form of chloride, which is not highly thermally-stable in a lithium chloride (LiCl) salt and is not easily solidified, can be converted into oxide or oxychloride, which is highly thermally-stable in the lithium chloride (LiCl) salt and is easily solidified, without producing impurities. For this reason, the group II nuclides can be easily separated from the lithium chloride (LiCl) salt, and renewable lithium chloride (LiCl) can be recovered by the vacuum distillation method, thus greatly reducing the amount of radioactive waste that is produced. Additionally, it is expected that the method of the present invention will be able to improve economical efficiency because the raw materials used in the process of dry-treating spent nuclear fuel (pyroprocess) are recovered, and radioactive nuclides for final processing can be easily solidified.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of separating group II nuclides from a radioactive waste lithium chloride salt and recovering renewable lithium chloride, comprising the steps of:
   1) injecting lithium oxide into a lithium chloride salt containing group II nuclides to convert the group II nuclides into thermally-stable oxide or oxychloride; and
   2) vaporizing and condensing the lithium chloride salt under a reduced pressure condition to separate the group II nuclides and recover lithium chloride.

2. The method of claim 1, wherein, in the step 1), the group II nuclides are dissolved in the lithium chloride salt in the form of chloride.

3. The method of claim 1, wherein, in the step 1), the reaction of converting the group II nuclides into thermally-stable oxide or oxychloride is carried out by performing stirring at a temperature of 610° C. to 650° C. for 2 hours or more.

4. The method of claim 1, wherein, in the step 2), the lithium chloride salt is vaporized and condensed under the pressure-reduced condition of a temperature of 850° C. to 950° C. and a pressure of 2 Torr to 8 Torr.

5. The method of claim 1, wherein, in the step 2) lithium chloride is recovered in a recovery vessel, and wherein, a temperature of the bottom of the recovery vessel is 50° C. or less.

6. The method of claim 1, wherein, in the step 2), the lithium chloride is recovered in the form of a lump.

* * * * *